United States Patent
Mc Vicar et al.

(10) Patent No.: US 7,494,434 B2
(45) Date of Patent: Feb. 24, 2009

(54) BELT ALTERNATOR STARTER ACCESSORY DRIVE WITH DUAL TENSIONER

(75) Inventors: Paul J. Mc Vicar, Troy, MI (US); Cynthia A. Thurston, Dewitt, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 797 days.

(21) Appl. No.: 11/153,198

(22) Filed: Jun. 15, 2005

(65) Prior Publication Data

US 2006/0287146 A1 Dec. 21, 2006

(51) Int. Cl.
*F16H 7/08* (2006.01)
*F16H 7/12* (2006.01)

(52) U.S. Cl. ............... 474/109; 474/110; 474/135; 474/101; 474/134; 474/137

(58) Field of Classification Search ........... 474/141; 74/594.2; 29/159; 280/259
See application file for complete search history.

(56) References Cited

U.S. PATENT DOCUMENTS

| | | | |
|---|---|---|---|
| 5,531,648 A * | 7/1996 | Meckstroth et al. | 474/110 |
| 6,322,470 B1 * | 11/2001 | Markley et al. | 474/111 |
| 6,652,401 B2 | 11/2003 | Liu | |
| 2002/0039944 A1 * | 4/2002 | Ali et al. | 474/135 |
| 2002/0086751 A1 * | 7/2002 | Bogner et al. | 474/134 |
| 2004/0014542 A1 * | 1/2004 | Quintus | 474/135 |
| 2008/0020876 A1 * | 1/2008 | Tanaka | 474/110 |

FOREIGN PATENT DOCUMENTS

JP 3652177 5/2005

* cited by examiner

*Primary Examiner*—Thu Nguyen
*Assistant Examiner*—Henry Liu

(57) ABSTRACT

An accessory drive for an engine has a belt driven starter generator adapted for driving and being driven by the engine. In an exemplary embodiment, the drive includes a first engine drive pulley and a second starter drive pulley. A drive belt engages the drive pulleys for driving either pulley from the other. A dual belt tensioner made as a preassembled unit has a carrier with a central pivot mounted to the engine and first and second carrier arms extending radially from the central pivot. A first tensioner mounted on the first arm carries a first tensioner pulley biased against a first belt run adjacent the second drive pulley that is slack during engine starting. A second tensioner pulley carried on the second arm is biased against a second belt run adjacent the second drive pulley that is taut during engine starting A hydraulic strut connected to the second arm, and preferably included in the preassembled unit, provides moderate biasing for the second tensioner pulley during normal engine operation and velocity sensitive resistance, to increased belt forces, that limits reactive movement of the second tensioner pulley during engine starting and transient engine operation.

14 Claims, 2 Drawing Sheets

BELT ALTERNATOR STARTER ACCESSORY DRIVE WITH DUAL TENSIONER

TECHNICAL FIELD

This invention relates to internal combustion engines and, in particular, to a belt alternator starter accessory drive and to a dual belt tensioner for such a drive.

BACKGROUND OF THE INVENTION

Belt alternator starter (BAS) systems for hybrid vehicles differ from conventional accessory drive belt systems in that the torque to turn the system is not always generated from the crankshaft. During normal operation the engine crankshaft provides torque for rotating a motor generator (MG) unit, or starter generator, generally providing taut and slack sides of the belt on opposite sides of the MG pulley. During engine starting, the MG unit drives the system causing the slack side of the belt to switch to the opposite side of the MG unit. Accordingly, two belt tensioners are generally required in such systems, engaging the belt on opposite sides of the MG pulley.

During normal engine driven operation of the generator and other accessories, the loads placed on the belt drive are determined by the power required to drive the accessories, including the MG unit. These accessory drive loads are relatively light and accordingly require belt tensioning only at a moderate low level. Contrariwise, during engine starting, the motor generator unit is required to provide power to rotate the engine as well as the connected accessories. This requires a higher level of belt tensioning to control motion on the slack side of the belt and assure that the belt will not slip. But the higher belt tension may put excessive tensioning loads on the belt and bearings of the system components during normal engine operation, which occupies the vast majority of operating time of the belt drive system. Also, because of packaging requirements it is usually necessary to provide separate tensioner arms with different pivot locations on each side of the MG unit to attain the necessary tensioner arm geometry. An improved accessory drive system, and belt tensioner are accordingly desired.

SUMMARY OF THE INVENTION

The present invention provides an accessory drive for an engine having a belt driven starter generator adapted for driving and being driven by the engine. In an exemplary embodiment, the drive includes a first engine drive pulley and a second starter drive pulley. A drive belt engages the drive pulleys for driving either pulley from the other.

A dual belt tensioner, made as a preassembled unit, has a carrier with a central pivot mounted to the engine and first and second carrier arms extending radially from the central pivot. A first tensioner mounted on the first arm carries a first tensioner pulley that moderately biases a first belt run, adjacent the second drive pulley, to take up slack during engine starting. A second tensioner pulley carried on the second arm is biased against a second belt run, adjacent the second drive pulley, that is taut during engine starting.

A hydraulic strut connected to the second arm, and preferably included in the preassembled unit, provides moderate biasing for the second tensioner pulley during normal engine operation and velocity sensitive resistance to increased belt forces occurring during engine starting. The resistance limits reactive movement of the second tensioner pulley while the engine is being started.

These and other features and advantages of the invention will be more fully understood from the following description of certain specific embodiments of the invention taken together with the accompanying drawings.

DESCRIPTION OF AN EXEMPLARY EMBODIMENT

Figure 1:
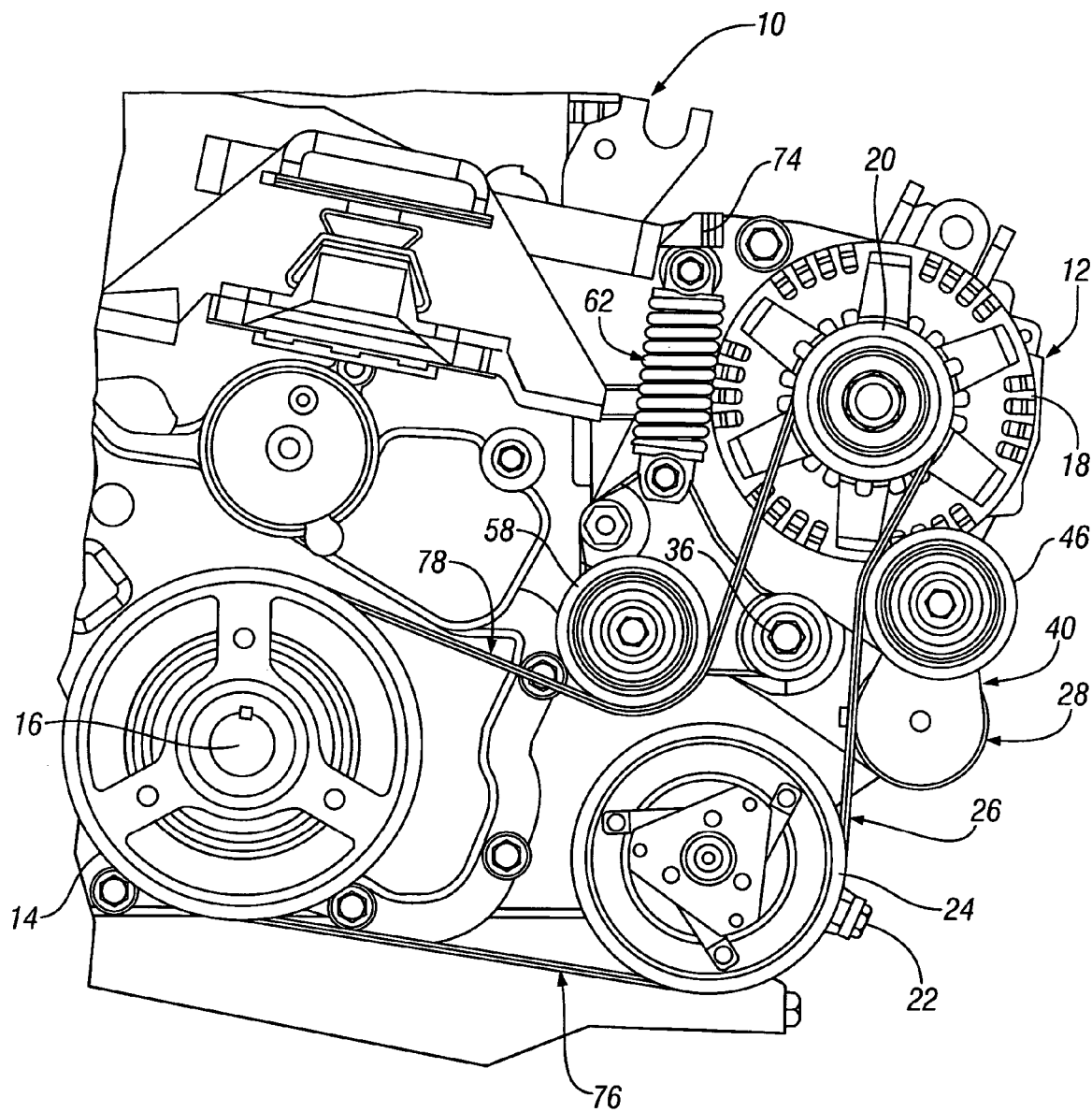
FIG. 1 is a fragmentary front view of a hybrid vehicle engine having a belt alternator starter (BAS) system with a dual belt tensioner according to the invention.

Referring now to the drawings in detail, numeral 10 generally indicates an engine for a hybrid vehicle having a belt alternator starter (BAS) accessory drive system 12. System 12 includes an engine drive pulley 14 mounted on an end 16 of an engine crankshaft. A motor generator (MG) unit, operative as a starter generator 18, is mounted on the engine at a lateral distance from the crankshaft and includes a starter drive pulley 20 rotatable with a rotor of the starter generator. An optional second accessory 22, which may be an air conditioner compressor, is also mounted on the engine and carries a third driven pulley 24 positioned in a triangular relation with the two drive pulleys 14, 20. A drive belt 26 is connected between and engages all three pulleys for rotating together the engine crankshaft, the starter generator, and the second accessory 22.

Figure 2:
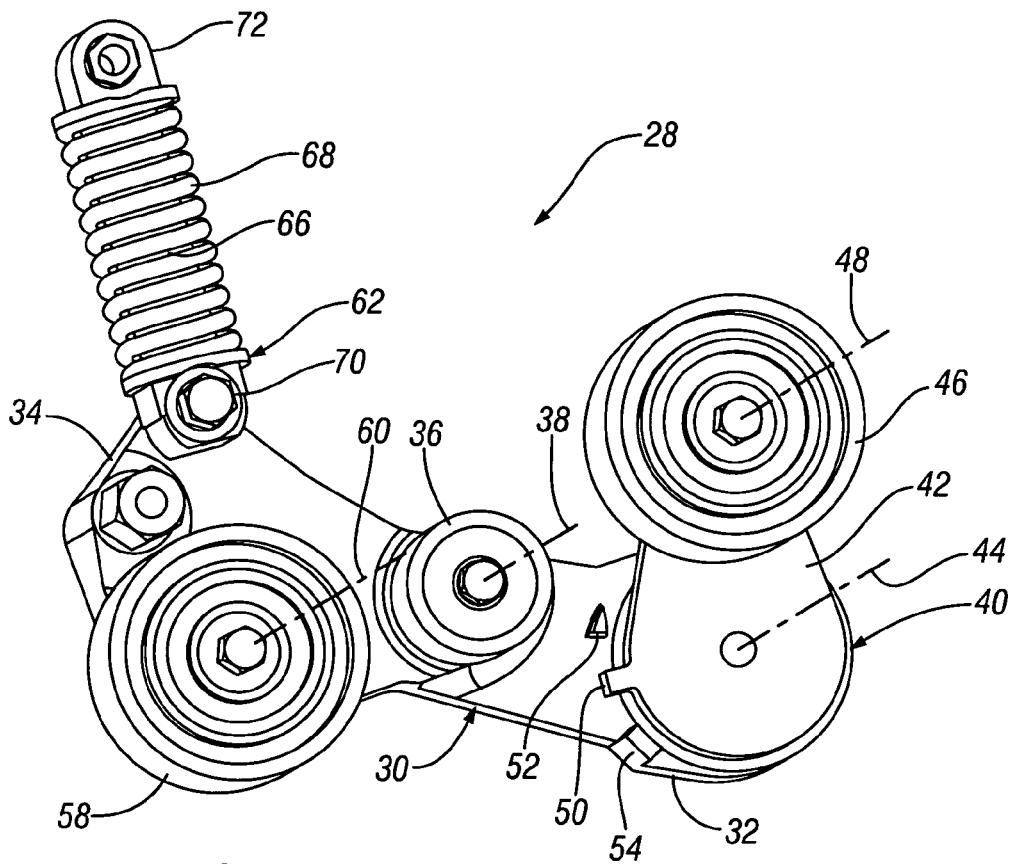
FIG. 2 is a pictorial front view of the pre-assembled tensioner.
Figure 3:
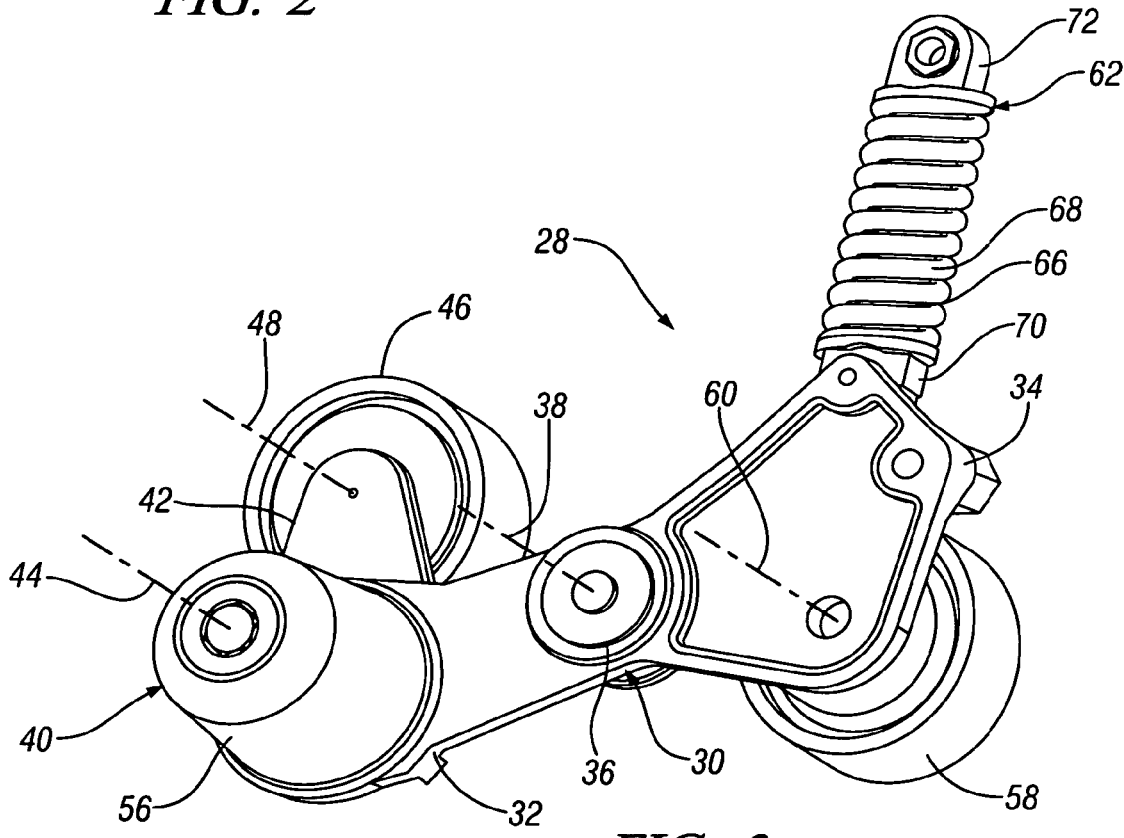
FIG. 3 is a pictorial back view of the pre-assembled tensioner.

To properly tension the belt 26, the drive system 12 is further provided with a dual belt tensioner 28, formed as a pre-assembled unit and further illustrated in FIGS. 2 and 3 of the drawings. Tensioner 28 is an assembly including a one-piece carrier 30 having oppositely extending first and second arms 32, 34 fixed to and extending oppositely from a central pivot 36. The pivot 36 is mounted to a support, not shown, fixed to the engine to permit pivotal motion of the unitary carrier 30 around the pivot 36 and an associated pivot axis 38.

At the end of the first carrier arm 32, there is mounted a first tensioner 40 including a lever 42 pivotally mounted at one end on a second axis 44. The lever 42 carries at an opposite end a first tensioner pulley 46 rotatably mounted on a third axis 48 spaced from the second axis and the central pivot axis 38 of the carrier 30. All three of these axes are parallel with one another. The tensioner lever 42 includes a projecting lug 50, which is adapted to engage stops 52, 54 on the first carrier arm 32 in order to limit pivotal motion of the first tensioner 40. As shown in FIG. 3, a housing 56 on the rear of carrier arm 32 encloses a resilient member such as a coil spring, not shown, biasing the first tensioner lever 42 in a counter-clockwise direction as viewed from the front in FIGS. 1 and 2.

The second carrier arm 34 carries a second tensioner pulley 58 rotatably mounted on a fourth axis 60 parallel with and spaced generally opposite the third axis 48 so that the tensioner pulleys are positioned generally opposite from the pivot axis. Thus, the first tensioner pulley 46 is biased generally clockwise toward the second tensioner pulley 58.

Also mounted on the second carrier arm 34, is a second tensioner 62 in the form of a hydraulic strut comprising a central hydraulic cylinder 66 surrounded by a compression coil spring 68. Strut 62 is connected at a lower eye 70 to the second carrier arm 34 and extends upwardly to an upper eye 72 that, in assembly, is secured to a fixed support 74 fixedly connected to the engine 10.

The second tensioner 62 is designed so that the compression spring 68 acts continuously against the upper and lower eyes 72, 70 to bias the cylinder 66 in an extending direction, toward which the cylinder is internally designed to move freely. However, the cylinder includes internal velocity sensitive damping which limits the rate of compression caused by belt forces acting against the cylinder.

As installed on the engine 10, as shown in FIG. 1, the drive belt 26 has a first combined run 76 extending in the direction of belt travel from the starter pulley 20 to and around the third accessory pulley 24 to the engine crank pulley 14. A second run 78 extends in the direction of belt travel from the crank pulley 14 to the starter pulley 20. When the engine is operating normally, the tensioned side of the belt is the first belt run 76 and the second belt run 78 is the slack side. However, when the engine is being started by rotation from the starter generator 18, the tensioned side of the belt is the second run 78 and the first run 76 is the slack side.

The dual belt tensioner 28 is designed, as installed, to tension both belt runs 76, 78. The first tensioner 40 is positioned to urge the first tensioner pulley 46 against a portion of the first belt run 76, which lies between the starter pulley 20 and the accessory pulley 24, to tension the slack side of the belt during engine starting and to pivotally yield to the increased belt tension on the first belt run 76 during normal engine operation. The second tensioner pulley 58 is urged against the second belt run 78 by the second tensioner 62 and, in particular, by the compression coil spring 68, which is biased toward extending the length of the second tensioner, hydraulic strut 62. Tensioner pulley 58 is positioned to contact the second belt run 78 intermediate its length and, in view of the triangular arrangement of the three drive and driven pulleys, causes the belt to wrap around tensioner pulley 58 with an approximately 90 degree arc. The wrap is selected to provide belt wraps in excess of 180 degrees around both the crank pulley 14 and starter pulley 20.

In operation, when the engine is running normally, tensioner pulley 58 tensions the slack side of the belt with a force, determined by the coil spring 68, sufficient to take up the slack in the second belt run 78 while the first tensioner pulley 46 rides against the belt on the opposite side of the starter pulley 20 on the tensioned first belt run 76. The arrangement is such that the first tensioner pulley 46 engages the first belt run with a force directed generally horizontally toward the second tensioner pulley 58. However, the second tensioner pulley 58 engages the second belt run 78 with a force acting generally vertically at approximate right angles to the force and the direction of motion of the first tensioner pulley 46.

As a result, pivotal motion of the carrier 30 with the arms 32, 34 has little effect upon the action of the first tensioner pulley 46 against the first belt run. Similarly, pivotal motion of the first tensioner pulley 46 against the first belt run has little effect on the action of the second tensioner pulley 58. Thus, the tensioner positions remain relatively constant during normal steady state engine operation and the tensioner forces applied by the first tensioner pulley 46 and by the spring 68 acting on the second tensioner pulley 58 are relatively moderate, though sufficient to control both belt runs during operation when the engine is driving the accessory and starter generator. In this way, the forces acting on the bearings of the mechanisms supporting the drive and driven pulleys and the bearings of the tensioner pulleys 46, 58 are subject to moderate loads, sufficient only as required to drive the accessory and motor generator unit from the crank pulley 14.

However, the force of the coil spring 68 is insufficient to hold the second tensioner pulley 58 in position against the force generated on the second belt run 78 by rapid engine speed changes during transient operation or by the torque of the starter generator applied to the accessory system when the starter generator is starting the engine. Under the latter relatively short period of operation of the accessory drive system, the hydraulic cylinder 66 applies a hydraulic damping force, which restrains contraction of the hydraulic cylinder 66 to a slow rate of change, thus applying velocity sensitive damping to the system. The cylinder thus applies a restraining force opposing movement of the second tensioner pulley 58 resulting from the increased torque applied on the belt in the second belt run 78, so that the tensioner pulley 58 is allowed to move upward at only a very slow rate. In this manner, the initial position of the second tensioner pulley 58 is changed a relatively small amount during the relatively short engine starting cycle, in which the belt tension on the second belt run 78 is significantly increased. At the same time, the first tensioner pulley 46 is pivoted inward as necessary to take up the increased slack occurring in the first belt run 76 while the engine is being started.

As described, it can be seen that the dual belt tensioner and the accessory drive system of the present invention provide several advantages over the known prior art arrangements. For example, the tensioner 28 can be assembled and tested by a supplier and shipped to a vehicle assembly plant as a pre-assembled unit, ready to be installed on the engine without further testing. Also, with both tensioner pulleys mounted on the same carrier assembly, tolerances are reduced for pulley to pulley belt alignment. This serves to reduce the tendency for belt misalignment chirp noise. Additionally, the positioning of the hydraulic and mechanical tensioners on opposite sides of the carrier pivot and the direction of their motion is such as to reduce rotational excursions of the mechanical tensioner from engine crankshaft vibration and from system torsional resonance. Also, importantly, by providing hydraulic restraining force to the taut side belt run of the starter generator during the engine starting mode, the invention allows the hydraulic tensioner spring load to be minimized, thereby reducing belt loads during all other operating conditions. The life of the belt is therefore extended, as well as the life of the shaft bearings throughout the system.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A dual belt tensioner for a starter generator drive, the tensioner comprising:
    a pivotable carrier including a central pivot having a pivot axis and first and second fixed carrier arms extending radially from the pivot;
    a first tensioner pulley rotatably mounted on a first tensioner pivotally mounted on the first carrier arm, the first tensioner and the first tensioner pulley being movable on spaced axes parallel with the pivot axis;
    a second tensioner pulley carried on the second carrier arm and rotatable on another axis parallel with the pivot axis,
    the first tensioner biasing the first tensioner pulley generally toward the second tensioner pulley for tensioning a drive belt engagable by both tensioner pulleys.

2. The dual belt tensioner of claim 1 including a second tensioner connected to the second carrier arm and adapted, in use, to bias the second tensioner pulley against the drive belt.

3. The dual belt tensioner of claim 2 wherein the second tensioner is a hydraulic strut.

4. The dual belt tensioner of claim 3 wherein the hydraulic strut includes a spring for biasing the second carrier arm and an extendable hydraulic cylinder that allows free extension of the spring but hydraulically slows shortening of the spring to prevent rapid compression of the strut in use during limited periods of operation to start an engine with the drive and during transient operation.

5. The dual belt tensioner of claim 4 wherein the first tensioner is a mechanical tensioner.

6. The dual belt tensioner of claim 5 wherein the mechanical tensioner includes a resilient element biasing a pivotable lever carrying the first tensioner pulley.

7. An accessory drive for an engine having a belt driven starter generator adapted for driving and being driven by the engine, said drive comprising:
 a first drive pulley connected with an engine power output member and rotatable therewith;
 a second drive pulley connected with an electrical starter generator mounted on the engine;
 a drive belt engaging the drive pulleys for driving either pulley from the other; and
 a dual belt tensioner including a carrier having a central pivot mounted to the engine for pivotal motion thereon and first and second fixed carrier arms extending radially from the central pivot, a first tensioner pulley rotatably mounted on a first tensioner pivotally mounted on the first carrier arm,
 a second tensioner pulley rotatably mounted on the second carrier arm,
 the first tensioner biasing the first tensioner pulley against a first belt run from the second pulley to the first pulley for tensioning the first belt run, and the second pulley engaging a second belt run from the first pulley to the second pulley.

8. The accessory drive of claim 7 including a second tensioner connected between the second carrier arm and the engine and urging the second tensioner pulley against the drive belt for tensioning the second belt run.

9. The accessory drive of claim 8 wherein the second tensioner includes a spring applying a continuous biasing force against the second tensioner pulley.

10. The accessory drive of claim 9 wherein the second tensioner includes a hydraulic cylinder that hydraulically slows motion of the second tensioner pulley opposite to the direction of the biasing force of the spring.

11. The accessory drive of claim 10 wherein the second belt run forms a belt wrap around the second tensioner pulley of at least 60 degrees, causing a reaction load thereon during engine starting that exceeds the biasing force of the spring.

12. The accessory drive of claim 11 wherein the motion slowing action of the hydraulic cylinder is selected to limit pivotal motion of the carrier during engine starting and transient driving maneuvers.

13. The accessory drive of claim 11 including a third driven pulley drivably connected with a drivable accessory and engaging the first belt run between the first tensioner pulley and the first drive pulley, the tensioner pulleys being positioned to insure belt wraps of at least 180 degrees around each of the first and second drive pulleys.

14. The accessory drive of claim 10 wherein pivoting motion of the second tensioner pulley on the carrier has a significant component normal to pivoting motion of the first tensioner pulley on the first tensioner, whereby pivoting of the carrier due to belt forces on the second tensioner pulley has insubstantial effect on the biasing force of the first tensioner pulley.

* * * * *